United States Patent
Hayano

(10) Patent No.: US 8,893,843 B2
(45) Date of Patent: Nov. 25, 2014

(54) PROTECTION STRUCTURE AND ELECTRIC VEHICLE

(71) Applicant: Katsuhiko Hayano, Miyoshi (JP)

(72) Inventor: Katsuhiko Hayano, Miyoshi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 14/045,188

(22) Filed: Oct. 3, 2013

(65) Prior Publication Data

US 2014/0097641 A1    Apr. 10, 2014

(30) Foreign Application Priority Data

Oct. 9, 2012   (JP) ................................ 2012-224049

(51) Int. Cl.
| | |
|---|---|
| B60K 5/00 | (2006.01) |
| B60R 16/04 | (2006.01) |
| B62D 25/08 | (2006.01) |
| B60K 1/04 | (2006.01) |
| B60L 15/00 | (2006.01) |
| B60L 3/00 | (2006.01) |
| B60K 1/00 | (2006.01) |

(52) U.S. Cl.
CPC ............ *B62D 25/085* (2013.01); *B60K 1/04* (2013.01); *B60L 15/007* (2013.01); *B60L 3/0007* (2013.01); *Y02T 10/641* (2013.01); *B60K 1/00* (2013.01); *B60Y 2306/01* (2013.01); *B60L 2210/42* (2013.01)
USPC .......................... 180/232; 180/68.6; 180/68.5

(58) Field of Classification Search
CPC ............. B60K 1/00; B60K 1/02; B60K 1/04; B60L 3/003; B60L 3/0046; B60L 3/0084; B60L 11/18; B60L 15/007; B60R 16/04; B60R 19/52

USPC ............................... 180/68.5, 232, 68.6, 291
See application file for complete search history.

(56) References Cited

U.S. PATENT DOCUMENTS

| | | | | | |
|---|---|---|---|---|---|
| 5,293,951 | A | * | 3/1994 | Scott ............................ | 180/68.5 |
| 5,681,668 | A | * | 10/1997 | Reed et al. .................... | 429/100 |
| 6,186,256 | B1 | * | 2/2001 | Dignitti ........................ | 180/68.5 |
| 6,460,642 | B1 | * | 10/2002 | Hirano ......................... | 180/65.1 |
| 6,827,168 | B2 | * | 12/2004 | Miyazaki ..................... | 180/68.5 |
| 7,485,983 | B2 | * | 2/2009 | Asao et al. ................... | 307/10.1 |

(Continued)

FOREIGN PATENT DOCUMENTS

| | | |
|---|---|---|
| JP | A-2009-038920 | 2/2009 |
| JP | A-2009-058030 | 3/2009 |

(Continued)

*Primary Examiner* — Jeffrey J Restifo
*Assistant Examiner* — Travis Coolman
(74) *Attorney, Agent, or Firm* — Oliff PLC

(57) ABSTRACT

A protection structure is equipped with a protrusion a protector, and a protector fixation portion. An in-vehicle appliance is equipped with a corner portion, a first face, and a second face that the first and the second faces are adjacent to the corner portion. The protrusion is provided on the second face of the in-vehicle appliance. The protector covers the corner portion, equipped with a first portion and a second portion which the faces are opposed to the first face and the second face respectively, and equipped with a notch at an edge of the second portion thereof. The protrusion abuts on an edge of the notch. The protector fixation portion is provided on the first face of the in-vehicle appliance, and the protector is fixed to the in-vehicle appliance through the protector fixation portion.

5 Claims, 5 Drawing Sheets

(56) References Cited

U.S. PATENT DOCUMENTS

| | | | |
|---|---|---|---|
| 7,690,464 B2 * | 4/2010 | Yustick et al. | 180/68.5 |
| 7,913,786 B2 * | 3/2011 | Voigt et al. | 180/68.5 |
| 8,011,467 B2 * | 9/2011 | Asao et al. | 180/68.5 |
| 8,123,253 B2 * | 2/2012 | Tomizawa et al. | 280/851 |
| 8,196,689 B2 * | 6/2012 | Hosoda | 180/68.4 |
| 8,196,690 B2 * | 6/2012 | Kunkel et al. | 180/68.5 |
| 8,336,953 B2 * | 12/2012 | Greb | 296/193.04 |
| 8,365,858 B2 * | 2/2013 | Tamagawa et al. | 180/291 |
| 8,522,904 B2 * | 9/2013 | Strock | 180/68.5 |
| 8,596,685 B2 * | 12/2013 | Mauduit et al. | 280/781 |
| 2007/0115707 A1 * | 5/2007 | Koide | 363/146 |
| 2013/0037338 A1 * | 2/2013 | Harunari | 180/68.5 |

FOREIGN PATENT DOCUMENTS

| | | |
|---|---|---|
| JP | A 2010-173567 | 8/2010 |
| JP | A 2010-173569 | 8/2010 |
| JP | A 2011-20628 | 2/2011 |
| JP | A 2012-126152 | 7/2012 |

* cited by examiner

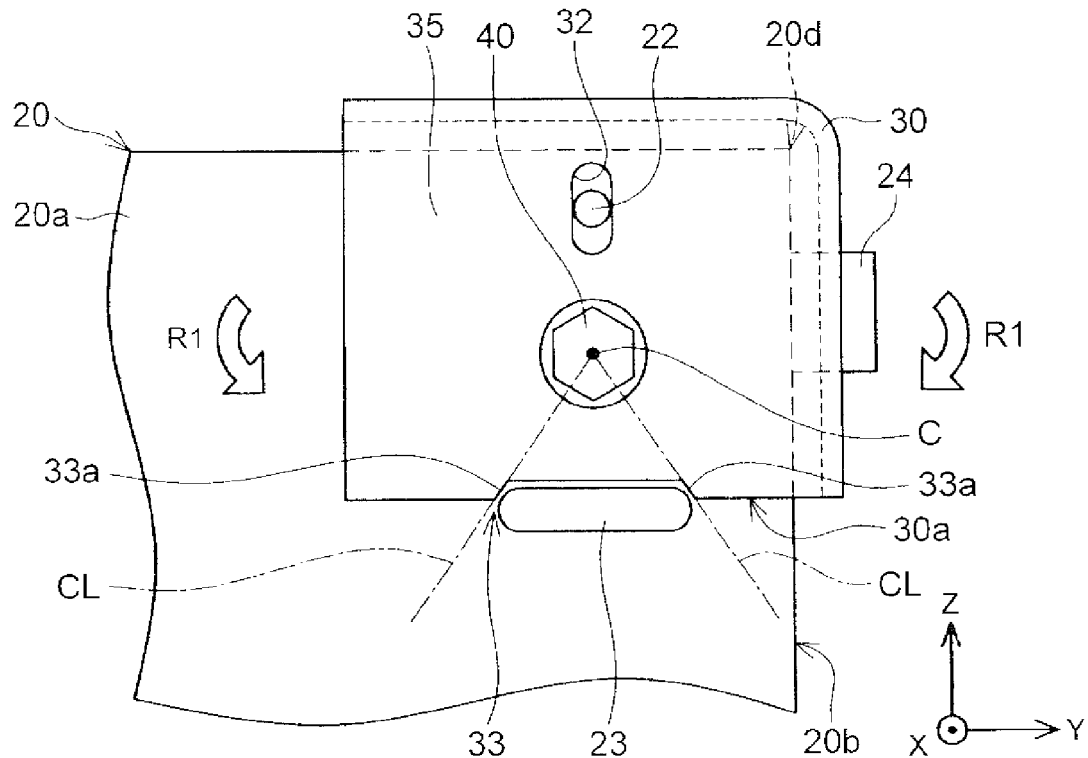
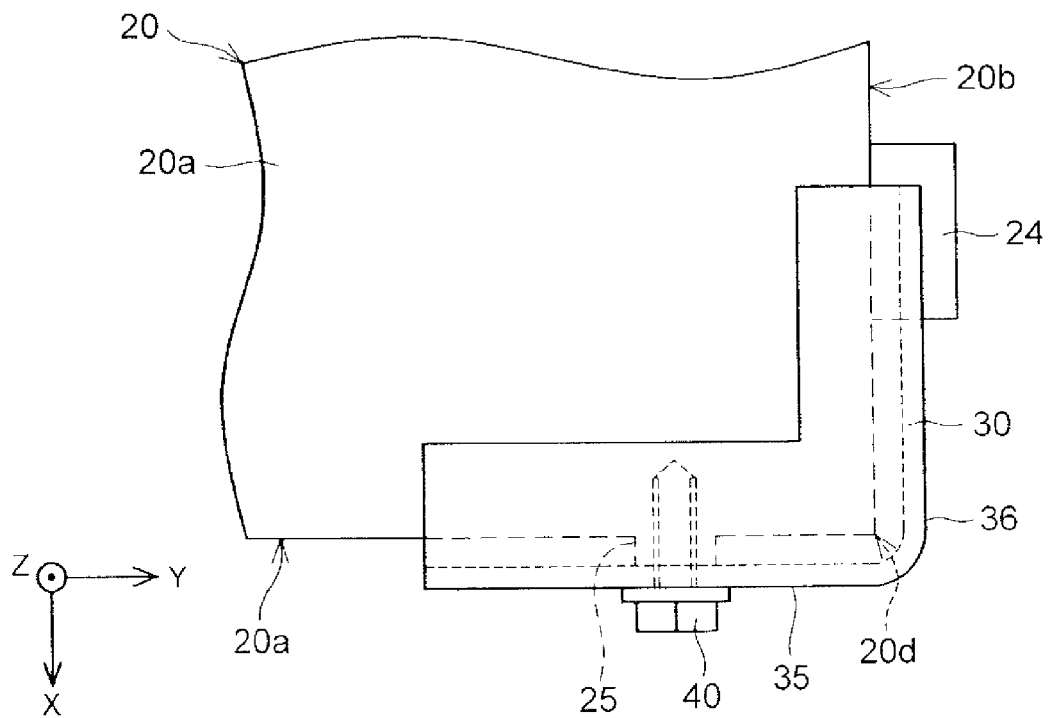

PROTECTION STRUCTURE AND ELECTRIC VEHICLE

INCORPORATION BY REFERENCE

The disclosure of Japanese Patent Application No. 2012-224049 filed on Oct. 9, 2012 including the specification, drawings and abstract is incorporated herein by reference in its entirety.

BACKGROUND OF THE INVENTION

1. Field of the Invention

The invention relates to a protection structure, and an electric vehicle that is equipped with the protection structure.

2. Description of Related Art

Various devices (in-vehicle appliances) such as an engine, a motor, controllers thereof, and the like are mounted in an engine compartment (which is also referred to as a front compartment) of a motor vehicle. In recent years, along with the propagation of hybrid vehicles, an inverter that supplies an electric power to a motor is also arranged in the engine compartment. Arts that protect the in-vehicle appliances from an impact of a collision have been studied. For example, in Japanese Patent Application Publication No. 2009-38920 (JP-2009-38920 A), there is disclosed an art for a housing that is equipped with a main body that accommodates a motor, and a connector accommodation portion that accommodates a connector outside the main body. In this art, the connector is protected if an external force acting on a rear portion of a vehicle is applied to the vehicle in the event of a collision of the vehicle.

SUMMARY OF THE INVENTION

When a motor vehicle collides with an obstacle, in-vehicle appliances in an engine compartment may receive a great impact. Thus, there is desired a structure that protects the in-vehicle appliances themselves as well as the connector from the impact of the collision. As a method of protecting the in-vehicle appliances, it is assumed to mount the in-vehicle appliances with metal plates as protectors. However, the operating efficiency is low if the protectors are mounted by a multitude of bolts. The present specification relates to a protector that protects in-vehicle appliances from an impact of a collision, and provides an art of achieving both mounting operability thereof and protection performance thereof.

A protection structure according to a first aspect of the invention is configured as follows. The protection structure is equipped with a protrusion a protector, and a protector fixation portion. An in-vehicle appliance is equipped with a corner portion, a first face and a second face that the first and the second faces are adjacent to the corner portion. The protrusion is provided on the second face of the in-vehicle appliance. The protector covers the corner portion, equipped with a first portion and a second portion which the faces are opposed to the first face and the second face respectively, and equipped with a notch at an edge of the second portion thereof. The protrusion abuts on an edge of the notch. The protector fixation portion is provided on the first face of the in-vehicle appliance, and the protector is fixed to the in-vehicle appliance through the protector fixation portion.

Furthermore, the protection structure may also be configured as follows. The protrusion is flattened such that a longitudinal direction of the cross-sectional surface of the protrusion coincides with a straight line that passes through the corner portion, when viewed from the front of the second face. An end of the protrusion close to the corner portion abuts on the edge of the notch.

Furthermore, the protection structure may also be configured as follows. The protector is equipped with a recess at an edge of the first portion, the edge of the first portion extends from an edge of the second portion. The recess is a trapezoidal recess of the edge of the first portion, and is equipped with a pair of lateral edges equivalent to a pair of legs of a trapezoid respectively. The lateral edges are provided on a straight line that radially extends from the protector fixation portion. The in-vehicle appliance is equipped, on the first face thereof, with a convex portion that abuts on both the lateral edges.

Furthermore, the protection structure may also be configured as follows. The protector is equipped, on the first portion thereof, with a long hole on a straight line that passes through a center of the recess and the protector fixation portion. A longitudinal direction of the long hole coincides with the straight line that passes through the center of the recess and the protector fixation portion. The in-vehicle appliance is equipped, on the first face thereof, with a columnar protrusion that passes through the long hole.

An electric vehicle according to a second aspect of the invention is equipped with a battery and the aforementioned protection structure. The in-vehicle appliance is an inverter, and the inverter is arranged beside the battery in an engine compartment. The corner portion is located on front side of the inverter and the corner portion is opposed to the battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view of the protector region as viewed from the X-direction.

FIG. 5 is a view of the protector region as viewed from the Z-direction.

DETAILED DESCRIPTION OF EMBODIMENT

Figure 1:
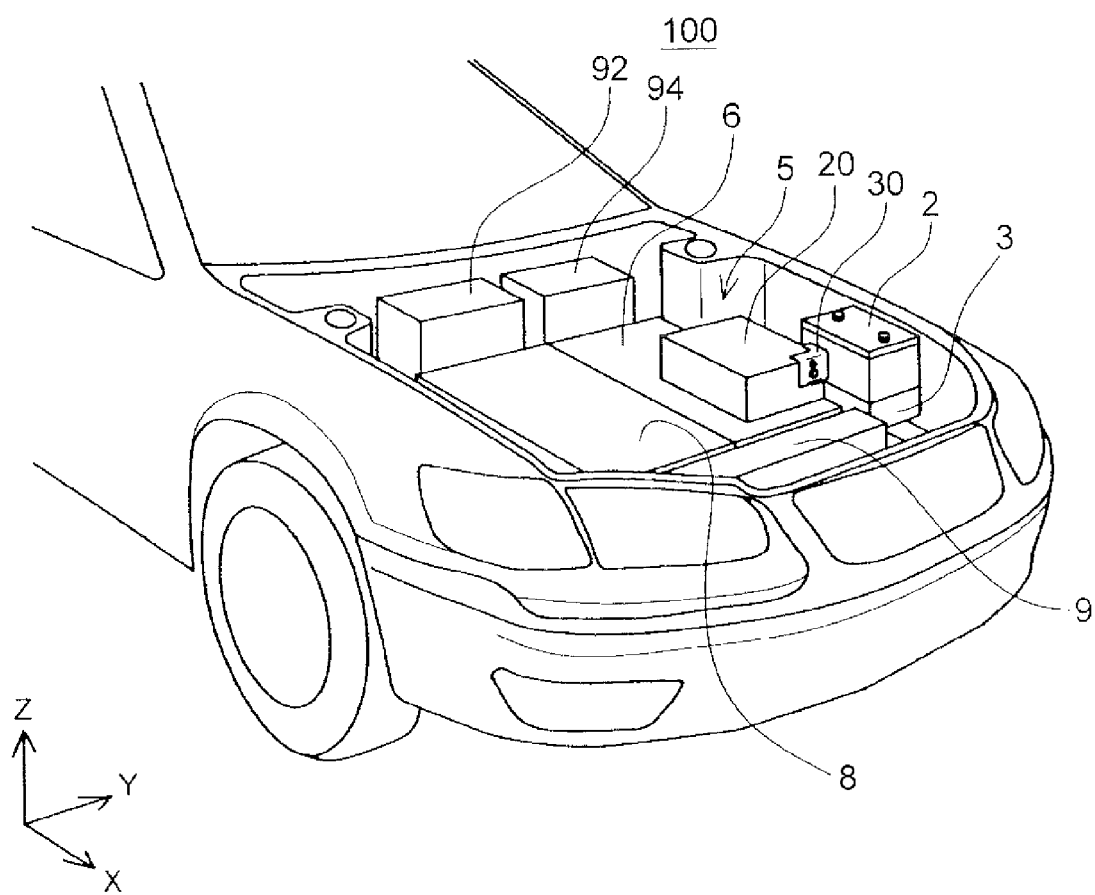
FIG. 1 is a schematic perspective view showing the layout of devices in the engine compartment of the vehicle.
Figure 2:
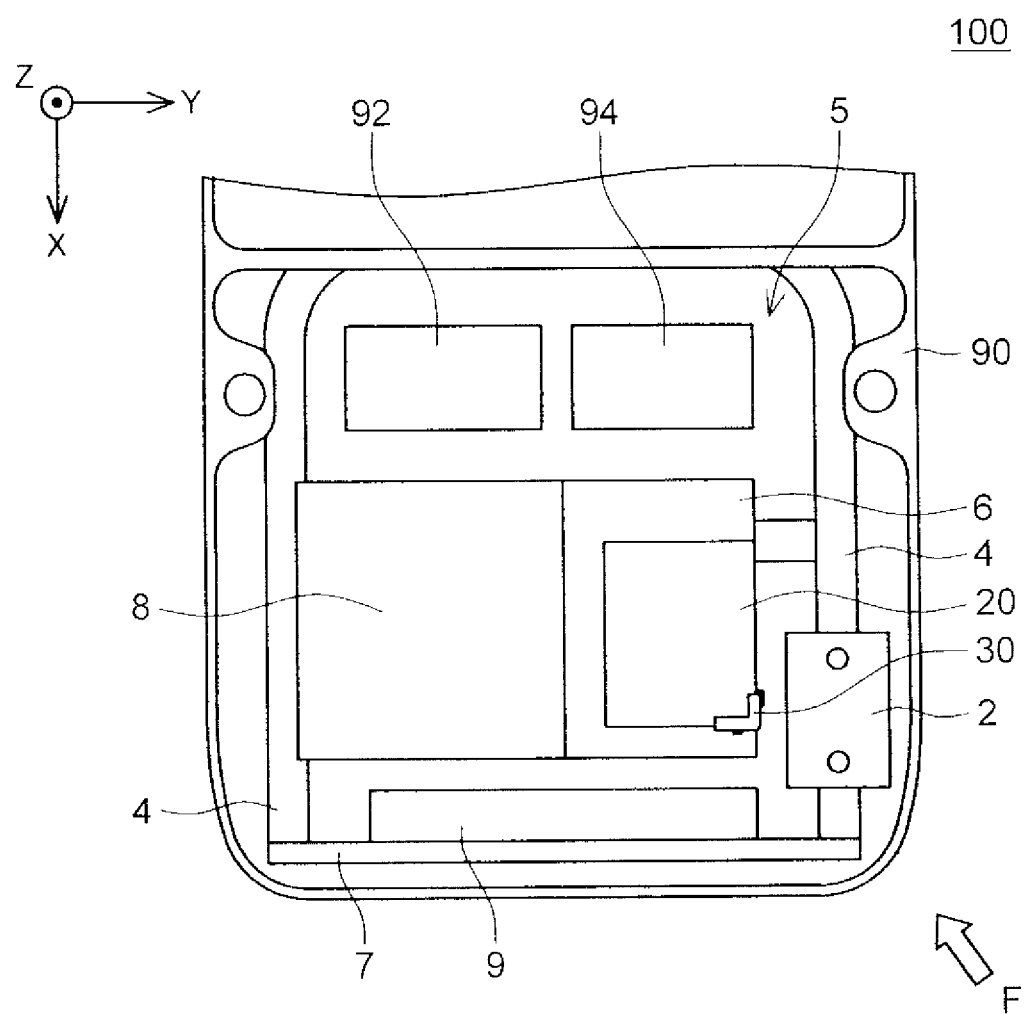
FIG. 2 is a schematic plan view showing the layout of devices in the engine compartment of the vehicle.

First of all, an example of layout of a group of devices that are mounted in an engine compartment of a vehicle will be described. FIG. 1 is a schematic perspective view showing the layout of devices in an engine compartment 5 of a vehicle 100, and FIG. 2 is a schematic plan view. Incidentally, in all the drawings, an X-direction corresponds to an area in front of the vehicle, a Y-direction corresponds to a lateral direction of the vehicle, and a Z-direction corresponds to an area above (vertically above) the vehicle.

A vehicle 100 is a hybrid vehicle that is equipped with an engine and a motor. Main devices that are mounted in the engine compartment 5 are an engine 8, a drive train 6 that includes a motor, a planetary gear and a differential gear, a subsidiary battery 2, a radiator 9 and an inverter 20. Besides, a relay box is denoted by a reference numeral 92, and a compressor of an air-conditioner is denoted by a reference numeral 94. The engine 8 and the drive train 6 are fixed to a side frame 4 (a side member) that constitutes a frame of the vehicle. The radiator 9 is fixed to a front frame 7 (a front bumper reinforcement) that constitutes part of the frame. Besides, the subsidiary battery 2 is fixed to the side frame 4 via a spacer 3.

The subsidiary battery 2 in the engine compartment 5 outputs a voltage of 12 V. The subsidiary battery 2 supplies electric power to an air-conditioner, a wiper, a headlight, and an electronic circuit in the inverter 20. A main battery that supplies driving electric power to the motor is arranged in a rear compartment (a luggage room) or in a lower portion of a rear seat, instead of being arranged in the engine compartment 5. The output of the main battery exceeds 100 V. Typically, the output voltage of the main battery is about 200 V. In general, the subsidiary battery 2 that supplies an electronic circuit, a power steering and the like with a low-voltage electric power other than a high-voltage electric power to be supplied to a vehicle driving motor is called an auxiliary battery or an accessory battery. On the other hand, a battery that stores an electric power to be supplied to a running motor is called a main battery. For example, the high-voltage electric power is a voltage that exceeds 100 V, and the low-voltage electric power is a voltage that is lower than 50 V.

The vehicle 100 is a hybrid vehicle, and is equipped with a motor-generator, a planetary gear and a differential gear inside the drive train 6. The planetary gear makes a changeover between an output of the engine and an output of the motor and transmits the output to the differential gear, or summates both the outputs and transmits them to the differential gear. The drive train 6 may also be called a power train or a transaxle (T/A).

The inverter 20 for controlling the motor in the drive train 6 is fixed to an upper face of the drive train 6. This arrangement is advantageous in that the length of a high-voltage conductive wire that couples the inverter 20 and the motor in the drive train 6 to each other can be shortened. The inverter 20 converts a voltage supplied from the main battery into a voltage suited for the driving of the motor, and then converts the voltage into an alternating-current voltage. More specifically, the inverter 20 is equipped with a voltage converter circuit and an inverter circuit. Besides, the inverter 20 is also endowed with a function of converting deceleration energy at the time of braking into electric energy. The electric power obtained from deceleration energy is called regenerative energy. Regenerative energy is accumulated in the main battery. The inverter 20 includes a voltage converter circuit and an inverter circuit for driving the motor, and a circuit for acquiring regenerative energy. Therefore, the inverter 20 may also be called an electric power controller or a power control unit.

A capacitor that smoothens an output of a DCDC converter circuit and an output of an inverter circuit is built in the inverter 20. In general, such a capacitor has a capacitance equal to or larger than 100 farad. Furthermore, the inverter 20 is equipped therein with an emergency discharge circuit that discharges the capacitor upon detection of an impact. That is, "the inverter" in the present specification includes an additional circuit that accompanies motor control, as well as an inverter circuit.

As described hitherto, a large-capacity electric power is accumulated in the inverter 20. Therefore, it is preferable to protect the inverter 20 to the utmost from an impact in the event of a collision. The subsidiary battery 2 and the inverter 20 fixed to an upper face of the drive train 6 are arranged side by side in the engine compartment 5. For example, if an obstacle enters from a direction indicated by an arrow F shown in FIG. 2, the subsidiary battery 2 may collide with the inverter 20. Thus, a protector 30 is attached to a corner portion of a case of the inverter 20, namely, a corner portion facing the subsidiary battery 2. The case of the inverter 20 is made of, for example, aluminum, and the protector 30 is made of a metal (e.g., iron) that is harder than aluminum. The inverter 20 is equivalent to an example of the in-vehicle appliances to be protected.

Figure 3:
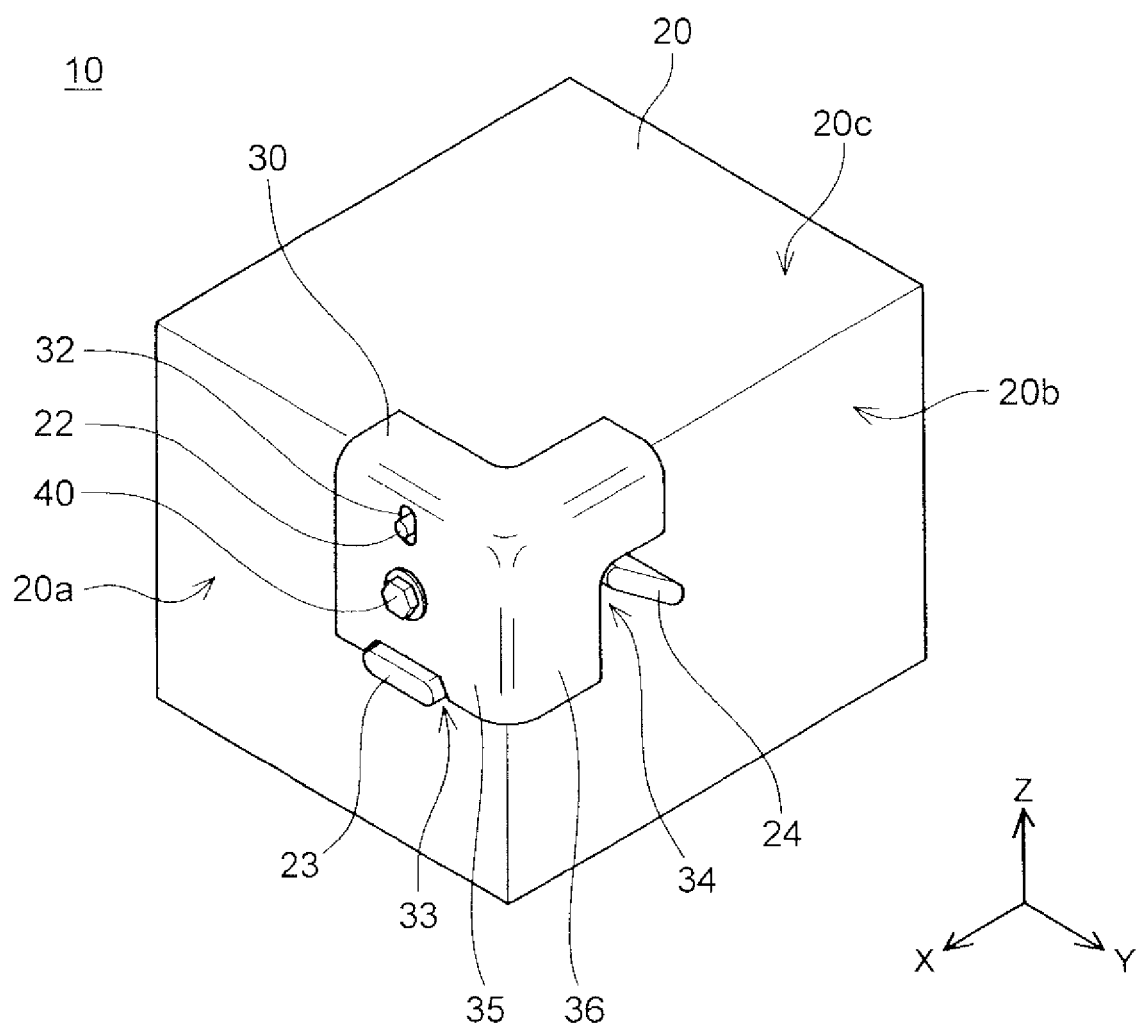
FIG. 3 is a perspective view of an inverter that is mounted with a protector.
Figure 6:
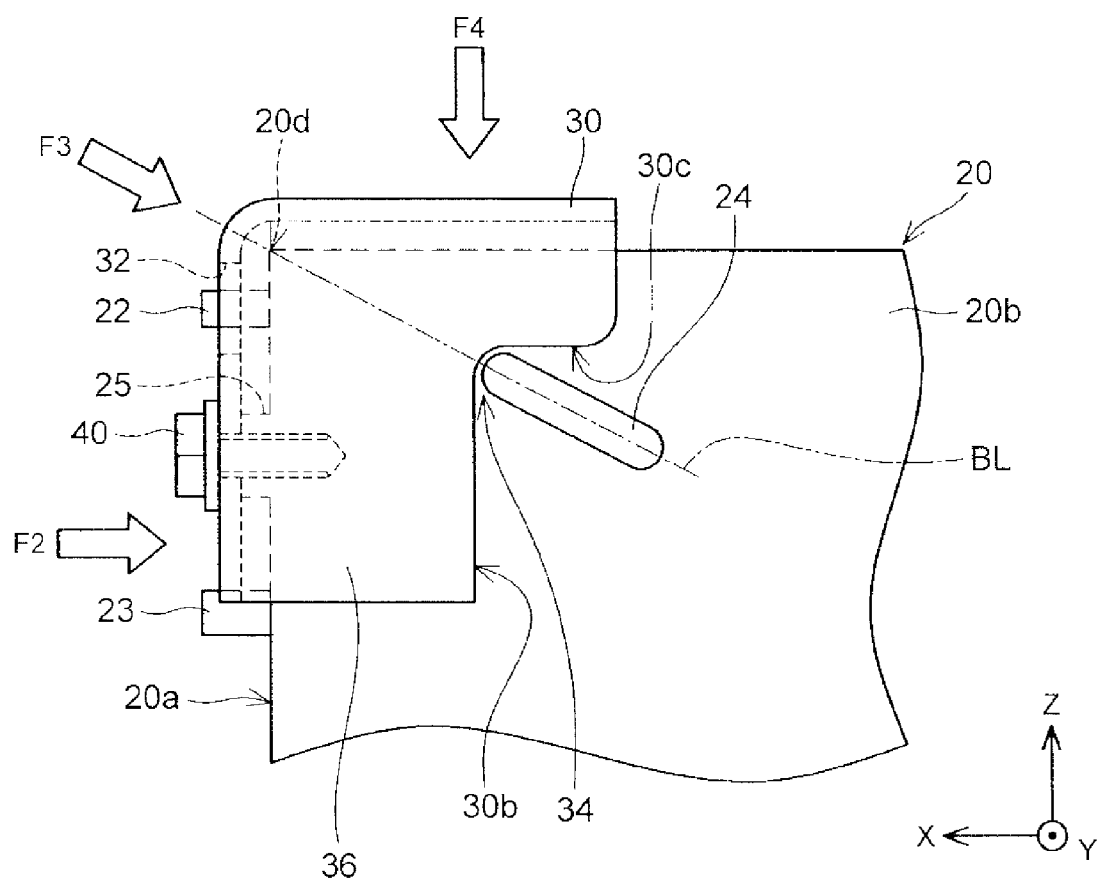
FIG. 6 is a view of the protector region as viewed from the Y-direction.

Subsequently, a protection structure of the inverter 20 will be described. FIG. 3 is a perspective view of the inverter 20 that is mounted with the protector 30. FIGS. 4, 5 and 6 are a view of the protector region as viewed from the X-direction, a view of the protector region as viewed from the Z-direction, and a view of the protector region as viewed from the Y-direction respectively.

As described above, the protector 30 is a metal plate that is made of, for example, iron. As shown in FIGS. 4, 5 and 6, the protector 30 is provided in such a manner as to cover a corner portion 20*d* of the inverter 20. The corner portion 20*d* is a corner portion that faces an upper side of a face 20*a* of the inverter 20 that is directed forward with respect to the vehicle and the subsidiary battery 2. The corner portion 20*d* is an apex at which the front face 20*a*, a lateral face 20*b* and an upper face 20*c* of the case of the inverter 20 intersect with one another. The lateral face 20*b* is a lateral face that faces the subsidiary battery 2. As shown in FIG. 3, the protector 30 is fixed to one location of the front face 20*a* of the inverter 20 by, for example, a bolt 40. That is, a first portion 35 of the protector 30 that is opposed to the front face 20*a* of the inverter 20, and the front face 20*a* of the inverter 20 are fixed to each other by the bolt 40. As shown in FIG. 5, a pedestal 25 for fixation protrudes from the front face 20*a* of the inverter 20, and the protector 30 is fixed to a top face of the pedestal 25. The protector 30 can be mounted by the single bolt 40, and is therefore excellent in mounting operability. On the other hand, if the inverter 20 and the protector 30 were in contact with each other only at one location, a received impact would concentrate at the protector fixation portion.

Thus, the protector 30 is structured to be fixed at one point, but to abut on the inverter 20 at a plurality of locations. As shown in FIGS. 3 and 6, a protrusion 24 is provided on the lateral face 20*b* of the inverter 20. A notch 34 is provided in an edge 30*b* of a second portion 36 of the protector 30 that is opposed to the lateral face 20*b*. The edge 30*b* is directed backward with respect to the vehicle. The edge of the notch 34 abuts on (is engaged with) the protrusion 24. Referring to FIG. 6, the protrusion 24 is formed in a flattened (elongated) shape along a straight line BL that extends toward the direction of the to-be-protected corner portion 20*d* of the inverter 20 when viewed from the front of the lateral face 20*b* of the inverter 20, namely, from the Y-direction. That is, the longitudinal direction of the protrusion 24 coincides with the straight line BL. The flattened shape is for example a rounded rectangle such as shown in FIG. 6. Then, the protrusion 24 abuts, at an end thereof located forward with respect to the vehicle, namely, at an end thereof close to the corner portion 20*d*, on the notch 34. An end of the protrusion 24 is fitted in the L-shaped notch 34. Incidentally, in FIG. 6, with a view to making the drawing easy to understand, the notch 34 and the protrusion 24 are depicted with a slight gap therebetween. It should be noted that the notch 34 and the protrusion 24 actually abut on each other.

As shown in FIG. 6, the protrusion 24 is engaged with the notch 34 that is sandwiched by the edge 30*b* of the protector 30, which is directed backward with respect to the vehicle (in the negative direction of the X-axis), and an edge 30*c* of the protector 30, which is directed downward with respect to the vehicle (in the negative direction of the Z-axis). Thus, even in the case where an impact is received from any of directions indicated by reference symbols F2, F3 and F4 in FIG. 6, the pedestal 25 and the protrusion 24, which are provided on the front face 20a, support the protector 30, and the corner portion 20d of the inverter 20 is protected. The impact received by the protector 30 is dispersed to the pedestal 25 and the protrusion 24, and the concentration of a load of the impact is unlikely. In particular, the protrusion 24 increases in rigidity forward and upward with respect to the inverter 20. That is, the protrusion 24 is higher in rigidity in the longitudinal direction than in the direction perpendicular to the longitudinal direction, and hence can well endure an impact from the directions forward and upward of the inverter 20. That is, the protrusion 24 can well support the protector 30 against an impact from the direction indicated by the reference symbol F3.

Besides, the protector 30 abuts on (is engaged with) a convex portion 23 that is provided on the front face 20a of the inverter 20. A trapezoidal recess 33 is provided in an edge 30a of the first portion 35 of the protector 30 that is opposed to the front face 20a of the inverter 20. The edge 30a is directed downward with respect to the vehicle. The lower edge 30a is equivalent to an edge that is opposed to the front face 20a of the inverter 20 and extends from an edge opposed to the lateral face 20b. A pair of lateral edges 33a that are equivalent to a pair of both legs of a trapezoid of the recess 33 are provided in such a manner as to coincide with a straight line CL that radially extends from a center C of the fixation portion. The center C is a center of a screw hole for the bolt 40 that is provided through the pedestal 25. The convex portion 23 is a protrusion that is elongated in the X-direction, and both ends of the convex portion 23 abut on the pair of the lateral edges 33a of the recess 33 respectively. Incidentally, in FIG. 4, with a view to making the drawing easy to understand, the recess 33 and the convex portion 23 are depicted with a slight gap therebetween. It should be noted that the recess 33 and the convex portion 23 actually abut on each other.

The protector 30 is fixed to the inverter 20 at one location, and hence may rotate around a fixation point thereof. As shown in FIG. 4, when viewed from the front of the front face 20a of the inverter 20, the center of the screw hole for the bolt 40 in the fixation portion of the protector 30 and two abutment portions of the recess 33 and the convex portion 23 form a triangle. Therefore, even if an external force is applied to the protector 30 in a direction indicated by a reference symbol R1 in FIG. 4, the protector 30 does not rotate. In other words, even if an impact in the direction indicated by the reference symbol R1 is applied to the protector 30 in the event of a collision of the vehicle, the protector 30 protects the corner portion 20d of the inverter 20 instead of rotating with respect to the inverter 20. In still other words, the convex portion 23 and the recess 33 restrain the bolt 40 from slackening by being rotated by the protector 30.

Incidentally, as shown in FIG. 4, the two abutment portions of the convex portion 23 and the recess 33 are laterally symmetrically located with respect to a straight line in the Z-direction, which passes through the center C of the fixation portion. The two abutment portions are arranged in a well-balanced manner with respect to the center C of the fixation portion. Therefore, the protector 30 is unlikely to rattle with respect to the inverter 20. The convex portion 23 can also be reworded as a detent portion of the protector 30.

Besides, a columnar protrusion 22 is provided on the front face 20a of the inverter 20. The columnar protrusion 22 passes through a long hole 32 that is provided through the front face of the protector 30. The long hole 32 is arranged on a straight line that passes through the center of the trapezoidal recess 33 and the center C of the fixation portion. A longitudinal direction of the long hole 32 coincides with a straight line that passes through the center of the trapezoidal recess 33 and the center C of the fixation portion. The long hole 32 and the columnar protrusion 22 are utilized in mounting the protector 30 to the inverter 20. In mounting the protector 30 to the inverter 20, the columnar protrusion 22 is passed through the long hole 32, and the protector 30 is slid such that the trapezoidal recess 33 moves toward the convex portion 23. As soon as the pair of the lateral edges 33a of the trapezoidal recess 33 come into abutment on the convex portion 23, a bolt insertion hole on the protector side and a bolt fixation hole on the in-vehicle appliance side coincide with each other, and fixation is completed by passing the bolt 40 therethrough. In this manner, the columnar protrusion 22 serves as a guide of the long hole 32, so that the mounting operability of the protector 30 is enhanced.

Points to remember about the art described in the embodiment of the invention will be described. In the embodiment of the invention, the protection structure is constituted of the protector that covers the corner portion of the in-vehicle appliance, and the protrusion 24, the convex portion 23 and the columnar protrusion 22 that are provided on the lateral face of the in-vehicle appliance. The protector is fixed to the first face of the in-vehicle appliance only at one location. A typical application example of the protection structure is the protection of the inverter that is laid out in the engine compartment of the electric vehicle. For example, the battery and the drive train having the upper face to which the inverter is fixed are arranged side by side in the engine compartment. At this time, the battery and the inverter are adjacent to each other in the lateral direction. A typical collision pattern is a pattern in which an obstacle collides with the vehicle from an area located diagonally in front thereof. If the obstacle collides with the vehicle in such a pattern, the battery collides with the corner portion that is located in front of the inverter and is opposed to the battery. If the protection structure is applied to the corner portion that is located in front of the inverter and is opposed to the battery, the inverter can be protected from a collision of the aforementioned pattern. The in-vehicle appliance is not limited to the inverter, but may be a device that is equipped therein with electronic parts. As described in the embodiment of the invention, the art disclosed by the present specification is especially suited to protect the inverter that is arranged side by side with the battery in the engine compartment. Specifically, the art disclosed by the present specification is suited to protect the corner portion that is opposed to the lateral face of the battery of the inverter. Furthermore, it is appropriate that the battery have a resinous lateral face. In the event of a collision, if the resinous lateral face of the battery collides with the metal protector, the battery is destroyed, but the impact caused on the inverter is alleviated due to the destruction of the battery. Incidentally, it should be noted that the term "electric vehicle" includes a fuel-cell-powered vehicle and a hybrid vehicle that is equipped with both a running motor and an engine.

The inverter 20 according to the embodiment of the invention is equivalent to an example of the in-vehicle appliance. Besides, the pedestal 25, which is provided on the front face 20a of the inverter 20 and through which the hole in which the bolt 40 for fixing the protector 30 is screwed is provided, is equivalent to an example of the protector fixation portion. Besides, the convex portion that abuts on the trapezoidal recess may be replaced with two convex portions that separately abut on the pair of the lateral edges respectively.

As described above, the concrete examples of the invention have been described in detail, but these are nothing more than exemplifications and do not limit the claims. The art described in the claims includes those obtained by modifying or altering the concrete examples exemplified above in various manners. The technical elements described in the present specification or the drawings exert technical advantages alone or in various combinations, and are not limited to the combination described in the claims at the time of the filing of the application. Besides, the art exemplified in the present specification or the drawings can achieve a plurality of objects at the same time, and has a technical advantage by achieving one of the objects in itself.

What is claimed is:

1. A protection structure for an in-vehicle appliance, the in-vehicle appliance equipped with a corner portion, a first face that is adjacent to the corner portion, and a second face that is adjacent to the corner portion, the protection structure comprising:
    a protrusion provided on the second face of the in-vehicle appliance;
    a protector covering the corner portion, the protector being equipped with a first portion which is a face that is opposed to the first face, and a second portion which is a face that is opposed to the second face, the protector being equipped with a notch at an edge of the second portion, and the protrusion abutting on an edge of the notch, wherein the protrusion is flattened such that a longitudinal direction of the protrusion coincides with a straight line that passes through the corner portion, when viewed in a direction perpendicular to the second face, and wherein an end of the protrusion close to the corner portion abuts on the edge of the notch; and
    a protector fixation portion provided on the first face of the in-vehicle appliance, the protector being fixed to the in-vehicle appliance through the protector fixation portion.

2. The protection structure according to claim 1, wherein
    the protector is equipped with a recess at an edge of the first portion, the edge of the first portion extends from an edge of the second portion,
    the recess is a trapezoidal recess of the edge of the first portion, and is equipped with a pair of lateral edges equivalent to a pair of legs of a trapezoid respectively,
    the lateral edges are provided on a straight line that radially extends from the protector fixation portion, and
    the in-vehicle appliance is equipped, on the first face thereof, with a convex portion that abuts on both the lateral edges.

3. The protection structure according to claim 2, wherein
    the protector is equipped, on the first portion thereof, with a long hole on a straight line that passes through a center of the recess and the protector fixation portion,
    a longitudinal direction of the long hole coincides with the straight line that passes through the center of the recess and the protector fixation portion, and
    the in-vehicle appliance is equipped, on the first face thereof, with a columnar protrusion that passes through the long hole.

4. An electric vehicle comprising:
    a battery; and
    the protection structure according to claim 1, wherein
    the in-vehicle appliance is an inverter,
    the inverter is arranged beside the battery in an engine compartment, and
    the corner portion is located on front side of the inverter and the corner portion is opposed to the battery.

5. A protection structure for an in-vehicle appliance, the in-vehicle appliance equipped with a corner portion, a first face that is adjacent to the corner portion, and a second face that is adjacent to the corner portion, the protection structure comprising:
    a protrusion provided on the second face of the in-vehicle appliance;
    a protector covering the corner portion, the protector being equipped with a first portion which is a face that is opposed to the first face, and a second portion which is a face that is opposed to the second face, the protector being equipped with a notch at an edge of the second portion, and the protrusion abutting on an edge of the notch, wherein the protrusion is flattened such that a longitudinal direction of the protrusion coincides with a straight line that passes through the corner portion, when viewed in a direction perpendicular to the second face, and wherein an end of the protrusion close to the corner portion abuts on the edge of the notch;
    wherein the protector is equipped with a recess at an edge of the first portion, the edge of the first portion extends from an edge of the second portion,
    the recess is a trapezoidal recess of the edge of the first portion, and is equipped with a pair of lateral edges equivalent to a pair of legs of a trapezoid respectively,
    the lateral edges are provided on a straight line that radially extends from the protector fixation portion, and
    the in-vehicle appliance is equipped, on the first face thereof, with a convex portion that abuts on both the lateral edges; and
    a protector fixation portion provided on the first face of the in-vehicle appliance, the protector being fixed to the in-vehicle appliance through the protector fixation portion.

* * * * *